July 19, 1955  M. DISTEL  2,713,468
POSITIONING DEVICE
Filed May 4, 1953
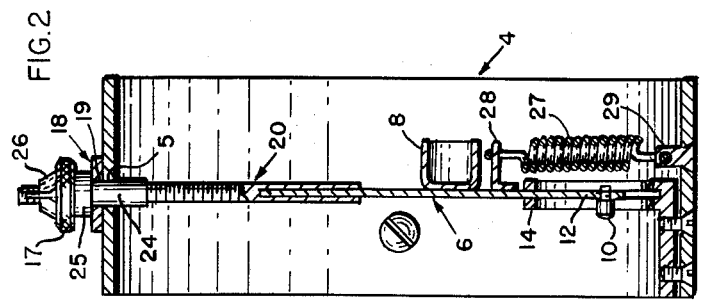
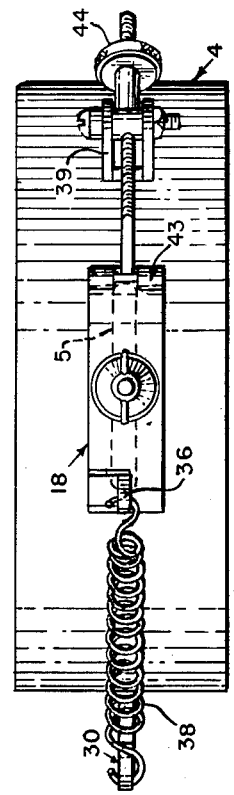
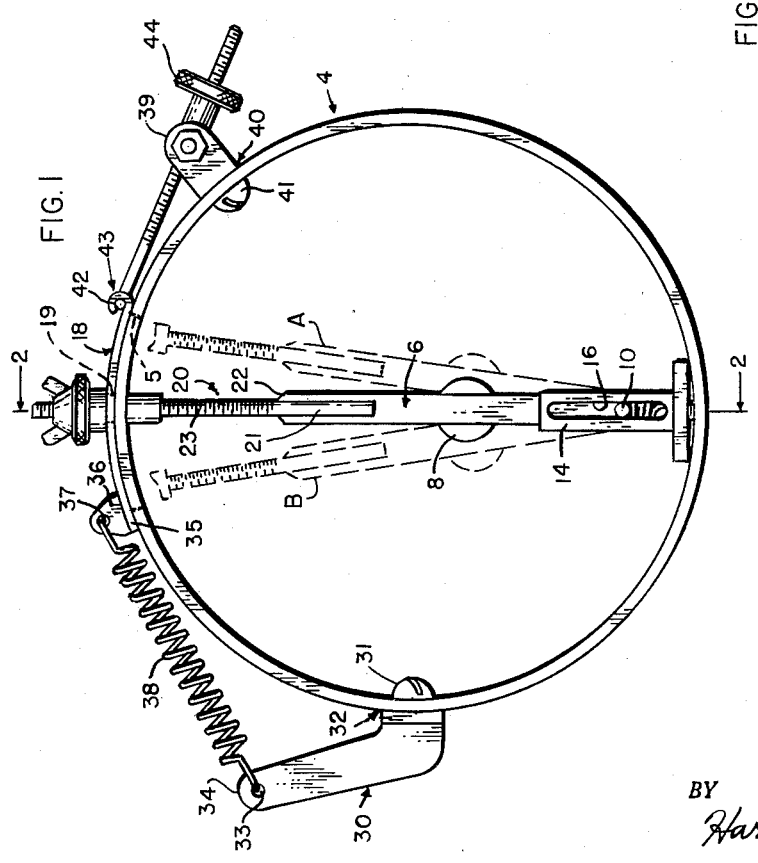
INVENTOR.
MAURICE DISTEL
BY
Harry M. Saragovitz
ATTORNEY ём
United States Patent Office 2,713,468
Patented July 19, 1955

2,713,468

POSITIONING DEVICE

Maurice Distel, Long Branch, N. J., assignor to the United States of America as represented by the Secretary of the Army Application May 4, 1953, Serial No. 353,021

4 Claims. (Cl. 248—186)

(Granted under Title 35, U. S. Code (1952), sec. 266)

The invention described herein may be manufactured and used by or for the Government for governmental purposes without the payment of any royalty thereon.

This invention relates to positioning devices and more particularly to an apparatus for accurately positioning a photocell in a predetermined plane.

In many situations, such as in the adjusting of probes in microwave apparatus or in the locating of the most sensitive spot in a photodetector, it is necessary to provide means for accurately positioning these devices in a system. For example, in determining the most sensitive spot in a photocell, it has been necessary, heretofore, to mask the optical system extensively thereby causing much time consumption and excessive inconvenience. In addition, the positioning apparatus used, generally, has been of a complex and cumbersome character requiring several adjustments of a positioning member to attain a desired position.

It is, therefore, a primary object of the present invention to provide an apparatus for accurately positioning a photocell in a predetermined plane.

In accordance with the present invention, there is provided an apparatus for positioning a photocell in a predetermined plane comprising a housing having a peripheral slot therethrough, a support within said housing disposed in said plane for mounting said photocell, a member slidably mounted on said housing, means affixed to said support and extending through said slot and said member for reciprocally actuating said support in a linear path, a first bracket affixed to said housing and spaced from one end of said member, tensioning means between said first bracket and said one end of said member, a second bracket affixed to said housing and spaced from the other end of said member and means connected between said second bracket and said other end of said member for moving said member in a direction lateral to said linear path thereby angularly displacing said support in said plane.

For a better understanding of the present invention together with other and further objects thereof, reference is had to the following description taken in connection with the accompanying drawings and its scope will be pointed out in the appended claims.

In the drawing, Figure 1 is a plan view of a preferred embodiment of the invention;

Figure 2 is a view partly in section along line 2—2 of Figure 1 looking in the direction of the arrows; and Figure 3 is a side elevation of the device shown in Figure 1.

Referring now more particularly to the drawings, in Figure 1, there is shown a subsantially cylindrical housing 4 which is made of a suitable strong rigid material and having a circumferentially disposed slot 5 in the periphery thereof. Diametrically disposed within housing 4 is a support 6 for mounting a photocell 8. A protruding knob 10 is affixed to one end 12 of support 6 in a convenient manner. Affixed to the inner surface of housing 4 is a guide bracket 14 which has a substantially longitudinally disposed aperture 16 adapted to receive knob 10 which is free to move within the confines of said aperture. An arcuately contoured member 18 having a substantially centrally disposed hole 19 therethrough is juxtaposed over slot 5 on housing 4 and is adapted to move slidably in a circumferential path on the periphery thereof. A shaft 20 has an unthreaded end 21 affixed to the other end 22 of support 6 and a threaded end 23 which extends through slot 5 of housing 4 and hole 19 of member 18 and terminates beyond member 18. Over the portion of threaded end 23 which extends through slot 5 and hole 19, there is provided a collar or bushing 24. A second collar or bushing 25 is provided over the portion of threaded end 23 which extends immediately beyond member 18, bushing 25 abutting against member 18. A knurled nut 17 or other suitable device threadedly engages the portion of threaded end 23 immediately extending beyond bushing 25. Knurled nut 17 abuts against bushing 25 with the latter serving as a spacer to permit ready manipulation of nut 17. To confine knurled nut 17, there is provided a wing nut 26 which threadedly engages the terminal portion of threaded end 23 extending immediately beyond knurled nut 17. A hinge spring 27 is connected between housing 4 and support 6 by means of an angle bracket 28 affixed to support 6 and a stud 29 affixed to housing 4.

Spring 27 normally urges support 6 in a linear path toward guide bracket 14. Upon rotating knurled nut 17 in one direction, support 6 is urged in a direction counter to the direction urged by spring 27 while simultaneously tensioning spring 27, and upon rotating knurled nut 17 in the opposite direction, support 6 moves in the same linear path toward guide bracket 14. In this manner, support 6 is reciprocally actuated in a linear path and the tensioning action of spring 27 provides a counterforce to the movement of support 6 effected by the rotating of knurled nut 17. In this manner, closely controlled movement of support 6 is made possible permitting the very accurate positioning in a linear path of a photocell or other device mounted on support 6.

An angular bracket 30, affixed to housing 4 at 32 by means of a screw 31, and having an eye 33 through the free end 34 thereof is circumferentially spaced from one end 35 of member 18. End 35 of member 18 is provided with a lug 36 having an eye 37 substantially as shown. Connected between bracket 30 and end 35 is a spring 38 which normally urges member 18 toward bracket 30, one end of spring 38 being affixed to bracket 30 at eye 33 and the other end being affixed to lug 36 at eye 37. A bracket 39, such as a swivel block, is affixed to housing 4 at 40 by means of a screw 41 and is circumferentially spaced from the other end 42 of member 18. A machine screw 44 threadably engages bracket 39 and is attached to other end 42 of member 18 by means of a hook arrangement 43, substantially as shown.

Upon rotating screw 44 in one direction, member 18 is circumferentially slideably urged toward bracket 39 on housing 4 while simultaneously tensioning spring 38 and upon rotating screw 44 in the opposite direction, member 18 is slideably moved toward bracket 30 while simultaneously releasing the tension on spring 38. As member 18 is slideably moved between brackets 30 and 39, support 6 is angularly displaced from its normal diametric disposition with the traversing of knob 10 in aperture 16 providing a pivotal point for its angular movement. When screw 44 is rotated in a direction urging member 18 toward bracket 39, support 6 and shaft 20 affixed thereto assume a position such as shown at position A and when screw 44 is turned in the opposite direction, spring 38 urges member 18 toward bracket 30 and member 6 and shaft 20 assume a position such as shown at B.

From the foregoing, it is readily clear that the present invention provides an apparatus for accurately positioning a photocell or like device in a predetermined plane by providing means for both positioning the device in a linear path in said plane and for positioning the device lateral to said linear path in said plane. This device requires only two adjustments in contradistinction to prior art devices which require several more.

While there has been described what is at present considered to be a preferred embodiment of this invention, it will be obvious to those skilled in the art that various changes and modifications may be made therein without departing from the invention and it is therefore aimed in the appended claims to cover all such changes and modifications as fall within the true spirit and scope of the invention.

What is claimed is:

1. An apparatus for positioning a photocell in a predetermined plane comprising a housing having a peripheral slot therethrough, a support for mounting said photocell within said housing disposed in said plane, a member slideably mounted on said housing, a shaft having an unthreaded end affixed to said support and a threaded end extending through said slot and said member, means threadably engaging said threaded end of said shaft for reciprocally actuating said support in a linear path, a first bracket affixed to said housing and spaced from one end of said member, tensioning means intermediate said first bracket and said one end, a second bracket affixed to said housing and spaced from the other end of said member, and means intermediate said second bracket and said other end of said member for moving said member lateral to said linear path thereby angularly displacing said support in said plane.

2. An apparatus for positioning a photocell in a predetermined plane comprising a substantially cylindrical housing having a circumferentially disposed peripheral slot therethrough, an arcuately contoured member juxtaposed over said slot, said member being adapted to slide circumferentially on said housing, a support diametrically disposed within said housing in said plane, a shaft having an end affixed to said support and a threaded end extending through said housing and said member, means threadably engaging said threaded end of said shaft for reciprocally actuating said support in a linear path, a first bracket affixed to said housing and circumferentially spaced from one end of said member, a spring intermediate said first bracket and said one end of said member normally urging said member slideably on said housing toward said first bracket, a second bracket affixed to said housing and circumferentially spaced from the other end of said member, a screw threadably engaging said second bracket and connected to said other end of said member for moving said member lateral to said linear path thereby angularly displacing said support in said plane.

3. An apparatus for positioning a photocell in a predetermined plane comprising a substantially cylindrical housing having a circumferentially disposed peripheral slot therethrough, an arcuately contoured member juxtaposed over said slot and circumferentially slideable on said housing, a support diametrically disposed within said housing in said plane, a protruding knob on one end of said support, a guide bracket affixed to said housing and having a longitudinally disposed aperture adapted to receive said knob, a shaft having one end affixed to the other end of said support and a threaded end extending through said slot and said member, means threadably engaging said threaded end of said shaft for reciprocally actuating said support in a linear path, a first bracket affixed to said housing and circumferentially spaced from one end of said member, a spring intermediate said first bracket and said one end of said member normally urging said member slideably on said housing toward said first bracket, a second bracket affixed to said housing and circumferentially spaced from the other end of said member, a screw threadably engaging said second bracket and connected to said other end of said member for moving said member lateral to said linear path thereby angularly displacing said support in said plane.

4. An apparatus for positioning a photocell in a predetermined plane comprising a substantially cylindrical housing having a circumferentially disposed peripheral slot therethrough, an arcuately contoured member juxtaposed over said slot and circumferentially slideable on said housing, a support diametrically disposed within said housing in said plane for mounting said photocell, a protruding knob on one end of said support, a guide bracket affixed to said housing and having a longitudinally disposed aperture adapted to receive said knob, a shaft having one end affixed to the other end of said support and a threaded end extending through said slot and said member, tensioning means intermediate said support and said housing normally urging said support in one direction in a linear path, means threadably engaging said threaded end of said shaft for moving said support in a direction opposite to said one direction in said linear path, a first bracket affixed to said housing and circumferentially spaced from one end of said member, a spring intermediate said first bracket and said one end of said member normally urging said member slideably on said housing toward said first bracket, a second bracket affixed to said housing and circumferentially spaced from the other end of said member, means threadably engaging said second bracket and connected to the other end of said member for moving said member lateral to said linear path thereby angularly displacing said support in said plane.

References Cited in the file of this patent

UNITED STATES PATENTS

| Number | Name | Date |
|---|---|---|
| 900,640 | Anderson | Oct. 6, 1908 |
| 2,132,172 | Langsner | Oct. 4, 1938 |
| 2,427,516 | Unertl et al. | Sept. 16, 1947 |
| 2,511,975 | French et al. | June 20, 1950 |